Figure 1:
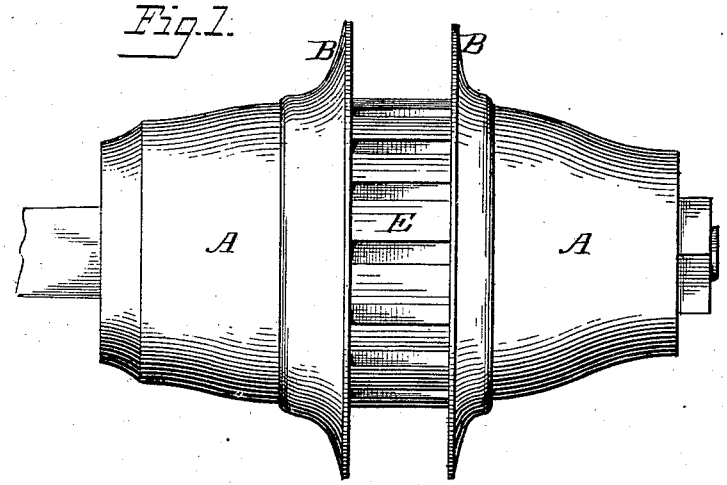

(No Model.)

G. UTLEY.
VEHICLE HUB.

No. 305,253. Patented Sept. 16, 1884.

WITNESSES:
L. C. Hills.
E. E. Masson.

INVENTOR:
Gabriel Utley
by Chas. J. Hedrick
his attorney

UNITED STATES PATENT OFFICE.

GABRIEL UTLEY, OF CHAPEL HILL, ASSIGNOR OF ONE-HALF TO JULIAN S. CARR, OF DURHAM, NORTH CAROLINA.

VEHICLE-HUB.

SPECIFICATION forming part of Letters Patent No. 305,253, dated September 16, 1884.

Application filed May 17, 1884. (No model.)

*To all whom it may concern:*

Be it known that I, GABRIEL UTLEY, a citizen of the United States, residing at Chapel Hill, in the county of Orange and State of North Carolina, have invented certain new and useful Improvements in Hubs for Wheels of Carriages, Wagons, and other Vehicles, of which the following specification is a full, clear, and exact description.

This invention relates to hubs of wood; and it has for its object to strengthen and protect the hub, and also to avoid the liability of the axle-box working loose. For these purposes the hub is inclosed in conical caps, which fit over the ends of the hub, and are bolted together at the middle, and the axle box or bearing, in two parts, is fastened to said caps, each bearing block or part of the axle-box being in one piece with the corresponding cap.

Ordinarily the axle-box extends through the hub, being commonly known as a "through-box," and it has splines which fit into grooves on the inside of the hub. This grooving weakens the hub considerably. The axle-box is also likely to work loose by wear, and has to be wedged up from time to time in order to center it. The hub is, moreover, left exposed, and depends upon its own natural strength to resist strains put upon it, except for the assistance it may derive from one or two metal bands or collars which are sometimes used. The advantages of the present invention are therefore obvious.

It may be observed that heretofore conical caps have been applied to the ends of hubs, and that a through-box has been cast integral with one of said caps. A hub has also been devised in which a fitting is used at each end, and the axle-box is made in two bearing-blocks, one bearing-block making part of each fitting. In such fitting there is no conical cap extending over the body of the hub, but only a narrow cylindrical collar, which fits over the reduced end of the hub, and the fittings are separately fastened to the hubs by screws passing through the face-plate that connects the collar and bearing-block into the hub. No hub, so far as I am aware, has been provided with two conical caps, which extend over the body of the hub, and are bolted together at the middle, and which have separate bearing-blocks permanently and rigidly secured one to each of said caps; nor am I aware of any hub having an axle-box formed in two blocks, each block being made integral with or otherwise fastened to a conical cap that fits over and incloses the corresponding half of the hub, however it may be fastened on said hub. These new constructions or combinations enable the objects before stated to be accomplished better or more perfectly than the constructions referred to as having been heretofore employed.

The accompanying drawings illustrate what is considered the best mode of applying the principle of the invention, and represents a hub constructed in accordance therewith.

Figure 2:
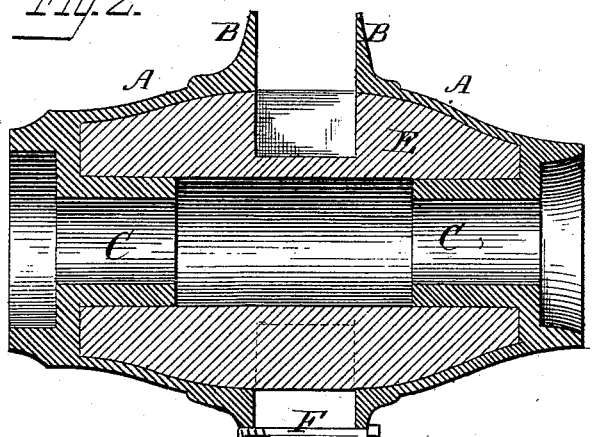
Figure 3:
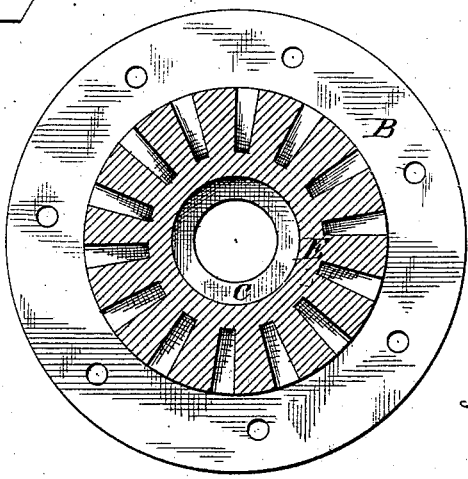

Figure 1 is a side view; Fig. 2, a central longitudinal section, and Fig. 3 a cross-section.

The two conical caps A are each provided with an outwardly-projecting flange, B, at the enlarged end, and the bearing-block C, which is inclosed within the cap, is fastened to the latter at the small or contracted end of the cap. The caps cover all of the hub E on each side of the spokes. The bearing-blocks extend into the central opening in the hub. The caps fit the hub closely, so as to have a bearing over the whole surface. They are bolted together, the bolts F passing between the spokes of the wheel. The bolts, being tightened, draw the caps together, so that these press upon the inclosed hub. The flanges, besides holding the bolts, act as side supports to the spokes. The bearing-blocks may extend any desired distance into the hub. It is preferred to use short blocks, about one-quarter of the length of the hub. The conical shape of the hub and caps centers the blocks accurately, and the large bearing-surface prevents the getting out of center. Each fitting can be made in one piece of metal by casting, and this is the mode in which it is designed to make them. The bolts are shown as passing through holes in one flange and screwed into threaded holes in the other; but nuts could be used on the bolts, if desired. The spokes are inserted in any ordinary or suitable way.

It is obvious that modifications could be made in details without departing from the spirit of the invention.

I claim all the new improvements described, to wit:

1. The wooden hub having the entire end on either side of the spokes inclosed in close-fitting conical caps, to which the axle-box, in two separate bearing-blocks, is permanently and rigidly secured, one bearing-block being attached to each cap and fitting within the corresponding end of the hub, substantially as described.

2. The wooden hub having the entire end on either side of the spokes inclosed in close-fitting conical caps, which are bolted together at the middle of the hub, and to which the axle-box, in two separate bearing-blocks, is rigidly and permanently secured, one block being attached to each cap and fitting within the corresponding end of the hub, substantially as described.

In testimony whereof I affix my signature in presence of two witnesses.

GABRIEL UTLEY.

Witnesses:
W. W. FULLER,
W. J. CHRISTIAN.